Patented Jan. 4, 1949

2,457,932

UNITED STATES PATENT OFFICE 2,457,932

SALTS OF TOCOPHERYL PHOSPHORIC ACID ESTERS

Ulrich V. Solmssen and John Lee, Essex Fells, N. J., assignors to Hoffmann-La Roche Inc., Nutley N. J., a corporation of New Jersey No Drawing. Application February 12, 1946, Serial No. 647,198

11 Claims. (Cl. 260—333)

Our invention relates to the synthesis of salts of tocopheryl phosphoric acid esters. These compounds have valuable therapeutic properties.

We have discovered that salts of tocopheryl phosphoric acid esters can be prepared by neutralizing tocopheryl phosphoric acid esters, under aqueous conditions, with bases, in the presence of an organic solvent. The term "aqueous" signifies externally added water, as distinguished from water formed in situ during the neutralization.

In general, we prepare salts of tocopheryl phosphoric acid esters, the esters have the formula:

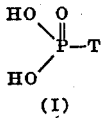

(I)

in which T represents the monovalent tocopheryl residue

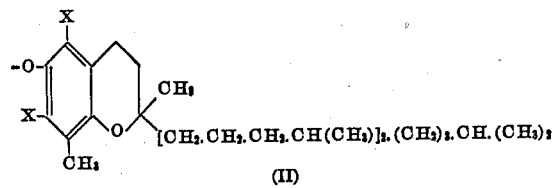

(II)

wherein X is hydrogen or methyl, at least one X being methyl.

One or both hydrogen atoms of the two hydroxyl groups in Formula I can be replaced according to our invention by cations selected from the group consisting of alkali metals, ammonium, alkyl ammonium radicals, and alkaline earth metals. For example, we prepare salts of sodium, potassium, lithium, ammonium, diethylamine, diethanolamine, and calcium. The tocopherol may be any of the synthetic or natural tocopherols. For example, we may employ alpha-tocopherol, beta-tocopherol, or gamma-tocopherol. It is also understood that the process is applicable to concentrates containing tocopherols. The process may be applied to mixtures of tocopherols as well as to isolated tocopherols. The salts may be prepared either as mono salts, di salts, or mixed salts. The final products may be purified, or they may be employed in their crude state.

The tocopheryl phosphoric acid esters are prepared by known phosphorylation procedures; in general, by reaction of the selected tocopherol with phosphorus oxychloride. The preparation of such esters, as well as salts thereof, is illustrated by the examples which appear hereinafter.

The conversion of the tocopheryl phosphoric acid esters into the metal salts, involves the following novel procedure. The tocopheryl phosphoric acid ester is neutralized, under aqueous conditions, with a base, in the presence of an organic solvent, which is a solvent for the tocopheryl phosphate acid salt, as e. g., the monosodium salt. Solvents which may be employed are, for example, lower aliphatic alcohols, such as methanol or ethanol; partially immiscible alcohols, such as iso-amyl alcohol, n-hexanol, cyclohexanol, and benzyl alcohol; and ether. Mixtures of solvents may also be employed. Water must be present. It may be added, e. g., with the solvent, or with the base, or with both.

A typical neutralization of our invention, is one involving the use of sodium hydroxide, in which complete neutralization takes place to form the di-sodium salts. This salt forms in the aqueous layer, from which it can be isolated by evaporation or by treatment with an excess of a water-miscible solvent, such as a lower aliphatic alcohol, acetone, dioxane, or the like. This treatment produces a precipitation of the di-sodium salt. The di-sodium salt obtained by our new method is soluble to the extent of about 25% in water, forming a clear limpid solution with no tendency to gel. Such a solution has a pH of about 10.0 at a concentration of about 10%, and is particularly suitable for medicinal purposes, especially for parenteral injection by the intramuscular route.

As pointed out heretofore, we may employ sufficient base to neutralize either one or both hydroxyl groups. It will be obvious that we may employ a salt in which only one hydroxyl group has been neutralized, and in which the other hydroxyl group is then neutralized by further treatment with a base.

The significance of our invention will be made apparent by the following illustrative examples, which will serve as a guide to those skilled in the art to practice the synthesis of our invention. The specific conditions of reaction may be varied depending upon the reagents employed. Obvious modifications are contemplated as being within the scope of our invention.

EXAMPLE 1

*Synthetic dl-α-tocopheryl phosphoric acid disodium salt*

500 g. of synthetic di-α-tocopherol are dissolved in 1500 cc. pyridine (C. P.) and phosphorylated at +25 to +30° by dropwise addition of 319 cc. phosphorus oxychloride. After the addition is complete the reaction mixture is left at room temperature overnight. The supernatant liquid is withdrawn from the precipitated pyridine hydrochloride. The latter is extracted with ether, the extract combined with the first liquid and evaporated in vacuum. The sirupy residue is again treated with ether and the resulting precipitate removed. This operation is repeated until the residue after evaporation is completely soluble in ether. The solution in 1.5 liters of ether is shaken on a machine with 1.5 liters of water. After 24 hours the water is replaced by fresh water. After shaking for an additional 24 hours the ether layer is separated, washed with water and evaporated in vacuum. The sirupy residue crystallizes on standing and consists of $\alpha$-tocopheryl phosphoric acid ester. The residue (600 g.) is dissolved in 1500 cc. iso-amylalcohol and thereto are added 2400 cc. water. The mixture is well stirred and neutralized to pH 11.4 with 6 N sodium hydroxide, requiring about 270 cc. The emulsion is separated into a top layer of iso-amylalcohol and a bottom layer of water. The latter is shaken again with four 250 cc. portions of iso-amylalcohol which are removed. The water layer is decolorized with 25 g. charcoal, filtered and with stirring run into 35 liters alcohol. The precipitated di-sodium salt monohydrate is collected by filtration. The salt is washed with hot alcohol and dried in vacuum at 60°.

Example 2

Diethanolamine salt 5 g. $\alpha$-tocopheryl phosphoric acid ester are dissolved in 20 cc. iso-amylalcohol and thereto added 40 cc. water. 2.5 g. of diethanolamine are added until the mixture reacts strongly alkaline. To the mixture acetone is added until no further precipitate occurs. The precipitate is a gum consisting of $\alpha$-tocopheryl phosphate di-diethanolamine salt. The substance is soluble in water, having a pH of 8.8 in 4% solution.

Example 3

Calcium salt 6.5 g. $\alpha$-tocopheryl phosphoric acid ester are dissolved in 30 cc. isoamylalcohol. Thereto 30 cc. water are added and a solution of 1.5 g. calcium chloride in 30 cc. water. On addition of 180 cc. ethyl alcohol a gum precipitates consisting of the calcium salt of $\alpha$-tocopheryl phosphoric acid. The supernatant liquid is decanted and the gum washed with alcohol and dried.

Example 4

Ammonium salt 5.4 g. $\alpha$-tocopheryl phosphoric acid ester are dissolved in 250 cc. 80% alcohol. Aqueous ammonium hydroxide is added until the mixture is strongly alkaline. The granular precipitate is centrifuged, washed with alcohol, dried at 60° in vacuum.

Example 5

The di-sodium salt prepared from a concentrate containing 40% natural mixed tocopherols 125 g. concentrate containing 40%=50 g. mixed natural tocopherols are dissolved in 180 cc. pyridine and thereto added, with stirring, 50 cc. phosphorus oxychloride. During the addition the temperature is controlled at 0 to +30° C. The mixture is left standing overnight at room temperature, then precipitated pyridine hydrochloride is removed by filtration. The filtrate is evaporated in vacuum. Addition of ether to the residue causes a second precipitation of pyridine salts which is removed by centrifugation. After evaporation of the clear liquid an oil remains, weighing 146.6 g. 400 cc. ether are added to effect solution, and the solution is shaken mechanically with 400 cc. water. After 15 hours the water layer is removed and replaced by the same amount of fresh water and shaking continued for 24 hours more.

The ether layer is separated and washed with water until the washwater is free of Cl ions. The ether is evaporated in vacuum to a sirup, weighing 131 g. which is dissolved in 217 cc. iso-amylalcohol. Thereto are added 435 cc. water. While stirring the emulsion, 220 cc. 1.048 N sodium hydroxide are added until the mixture has a pH 11.4. The emulsion is separated into two layers and the lower water layer separated and evaporated in vacuum. It remains a gelatinous sirup which becomes granular after trituration with acetone. Yield=43 g. mixed tocopheryl phosphate di-sodium salts. For purification and especially removal of sterol-phosphoric ester salts the crude salt is dissolved in water and acidified with hydrochloric acid. On heating or even in the cold, organic phosphates present as impurities are hydrolyzed while tocopheryl phosphoric esters remain intact and are subsequently reconverted into the di-sodium salts and isolated as described above.

Example 6

$\alpha$-Tocopheryl phosphoric acid di-sodium salt from natural $\alpha$-tocopherol Six grams of d-$\alpha$-tocopherol and 18 cc. of pyridine are phosphorylated with 3.8 cc. of phosphorus oxychloride at a temperature below +30° C. The reaction mixture is allowed to stand overnight at room temperature, diluted with ether, the pyridine hydrochloride filtered off, the ether solution washed and dried. The ether is evaporated and the residue treated with a further quantity of dry ether and the precipitated pyridine salt again removed by filtration. This is repeated until no further precipitate is formed and the residue from the ether is a clear yellow oil completely soluble without turbidity. The amount is approximately 8.2 g. This is dissolved in about 50 cc. of ether and shaken with 50 cc. of water on a machine for 48 hours in order to transform the tocopheryl phosphoryl chloride into the tocopheryl phosphoric ester. The ether solution, when washed with a second 50 cc. of water, is free of chlorine ions. On separation of the ether solution and evaporation, the residue weighing 7.0 g. is dissolved in a mixture of 20 cc. of isoamyl alcohol and 40 cc. of water and titrated to pH 10.0, consuming 20.0 cc. 1.048 N sodium hydroxide solution. The amyl alcohol layer is separated and poured slowly into 1500 cc. of ethyl alcohol. The salt is centrifuged off and dried in vacuum yielding 5.5 g. of d-$\alpha$-tocopheryl phosphoric acid di-sodium salt.

Example 7

Diethylamine salt 7.14 g. $\alpha$-tocopheryl phosphoric acid ester dissolved in a mixture of 100 cc. iso-amylalcohol and 150 cc. water are titrated with N/1 solution of diethylamine in water. The consumed cc. diethylamine solution are plotted against the pH of the mixture and a curve is obtained which shows the first neutralization point at pH 6.75 corresponding to the mono-diethylamine salt, and a second neutralization point at pH 9.25 corresponding to the di-diethylamine salt. The consumed amounts of diethylamine are 14.0 cc. N/1 solution = 1.02 g. diethylamine for the mono-diethylamine salt and 28.0 cc. N/1 solution = 2.04 g. diethylamine for the di-diethylamine salt. After titration, the mixture is evaporated in vacuum and the residue dissolved in 400 cc. boiling acetone. On cooling, a crystalline precipitate is obtained and filtered. The yield is 6.8 g. of mono-diethylamine salt of α-tocopheryl phosphate. On dissolving in a 42% mixture of water and propylene glycol the solution has pH 6.7, indicating that the product is the mono-diethylamine salt which has been formed through partial hydrolysis and removal of liberated diethylamine during the vacuum distillation of the reaction product. The mono-diethylamine salt is moderately soluble in contradistinction to the mono-sodium salt which is insoluble in water. By addition of less than one equivalent of diethylamine to a solution or suspension of the mono-diethylamine salt, the latter may be rendered more soluble by partial formation of the di-diethylamine salt. The pH of the solution may thus be adjusted anywhere between 6.7 and 9.25 yielding at the lower range a solution of the mono-diethylamine salt, in the intermediate ranges solutions of mixtures of mono-diethylamine and di-diethylamine salts, and at the higher range a solution of the di-diethylamine salt.

EXAMPLE 8

*The di-sodium salt prepared from mono-sodium α-tocopheryl phosphoric acid ester*

Mono-sodium α-tocopheryl phosphate is prepared by titrating a solution of 1 mol. equivalent tocopheryl phosphoric ester in iso-amylalcohol water mixture 3:5 with 1 mol. equivalent of 1 N aqueous sodium hydroxide solution to a pH of 6.8 and evaporating to dryness. This salt is practically insoluble in water.

1.86 g. mono-sodium α-tocopheryl phosphoric acid ester is dissolved in 25 cc. iso-amylalcohol and 40 cc. water. The mixture is neutralized with 40 cc. N/10 sodium hydroxide aqueous solution to pH 11.4. The iso-amylalcohol layer is separated, the aqueous layer shaken out with fresh iso-amylalcohol and the latter discarded. The aqueous solution is run into ethanol. On standing for 12 hours in the cold a precipitate appears and is filtered off, and consists of the di-sodium salt of α-tocopheryl phosphate.

We claim:

1. A process of making salts of tocopheryl phosphoric acid esters, which comprises reacting an alcoholic solution of a tocopheryl phosphoric acid ester, under aqueous conditions, with a base selected from the group consisting of alkali metal, alkaline earth metal, and ammonium bases, said alcohol being a solvent for the corresponding tocopheryl phosphate acid salt.
2. The process of claim 1 in which the solvent comprises a lower aliphatic alcohol.
3. The process of claim 1 in which the solvent comprises ethanol.
4. The process of claim 1 in which the solvent comprises benzyl alcohol.
5. The process of claim 1 in which the solvent comprises iso-amylalcohol.
6. The process of claim 1 in which sodium hydroxide is employed as the base.
7. The process of claim 1 in which calcium hydroxide is employed as the base.
8. The process of claim 1 in which diethylamine is employed as the base.
9. Diethylamine salts of tocopheryl phosphoric acid esters.
10. The process as in claim 1 in which di-salts of tocopheryl phosphoric acid esters are prepared.
11. A process of preparing the disodium salts of tocopheryl phosphoric acid esters which comprises reacting a tocopheryl phosphoric acid ester under aqueous conditions with sodium hydroxide in the presence of iso-amyl alcohol.

ULRICH V. SOLMSSEN.
JOHN LEE.

REFERENCES CITED

The following references are of record in the file of this patent:

UNITED STATES PATENTS

| Number | Name | Date |
|---|---|---|
| 2,296,291 | Milas | Sept. 22, 1942 |
| 2,345,690 | Solmssen | Apr. 4, 1944 |

FOREIGN PATENTS

| Number | Country | Date |
|---|---|---|
| 546,161 | Great Britain | June 30, 1942 |